United States Patent [19]
Friedman

[11] 3,913,751
[45] Oct. 21, 1975

[54] APPARATUS FOR AUTOMATICALLY FEEDING AND REMOVING CYLINDRICAL BODIES TO AND FROM A WORKING HEAD

[76] Inventor: Robert Friedman, Seven Sherman Ave., Closter, N.J. 07624

[22] Filed: Dec. 6, 1974

[21] Appl. No.: 530,182

[52] U.S. Cl. ............... 214/1 PB; 82/2.7; 214/1 P; 214/1.2; 226/162
[51] Int. Cl.² ......................................... B65H 51/26
[58] Field of Search ........................... 226/162–166; 214/1.1–1.5, 1 P, 1 PB, 1 R; 82/2.5, 2.7

[56] References Cited
UNITED STATES PATENTS

| | | | |
|---|---|---|---|
| 3,147,653 | 9/1964 | Jones, Jr. | 214/1.4 X |
| 3,439,816 | 4/1969 | Archambeau et al. | 214/1 PB X |
| 3,493,125 | 2/1970 | White et al. | 214/1.2 |

*Primary Examiner*—Frank E. Werner
*Attorney, Agent, or Firm*—Charles E. Baxley, Esquire

[57] ABSTRACT

An improved automatic apparatus for feeding and removing cylindrical bodies to and from a working head. The cylindrical bodies conduits are delivered in a row on a feed ramp. A delivery crank is provided to release a lowermost of the bodies so that it rolls into a longitudinal channel of a work tray to become a cylindrical workpiece. The channel is inclined transversely so that the workpiece rolls to a lower side thereof. A movable clamping jaw in its open position clears beyond the work tray and in its closed position it grips the workpiece in the higher side of the channel. The clamping jaws are connected to a movable carriage which engages the workpiece longitudinally into a working head and then returns the workpiece to the work tray. The movable clamping jaw then is opened and the workpiece rolls to the lower side of the channel. Thereafter, the entire work tray is flipped upwardly by an ejector crank to discharge the workpiece which clears between the clamping jaw.

5 Claims, 11 Drawing Figures

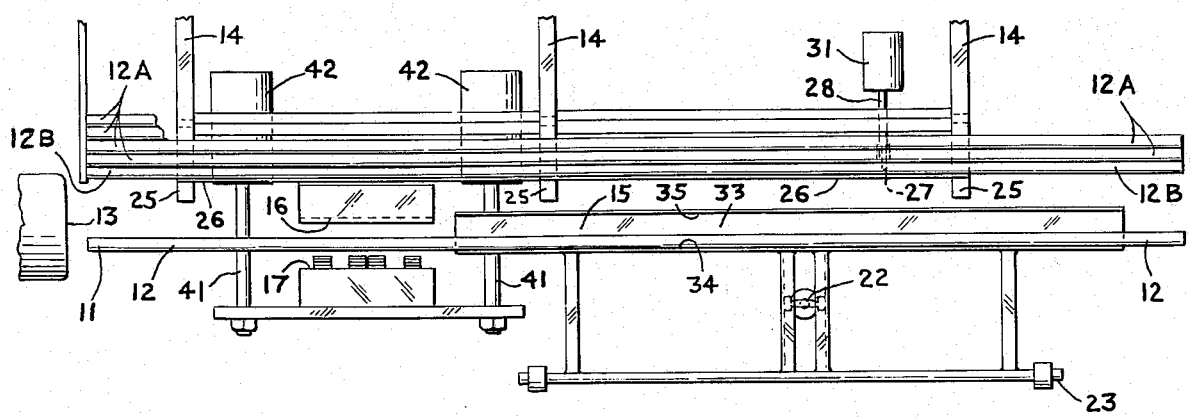
FIG. 1
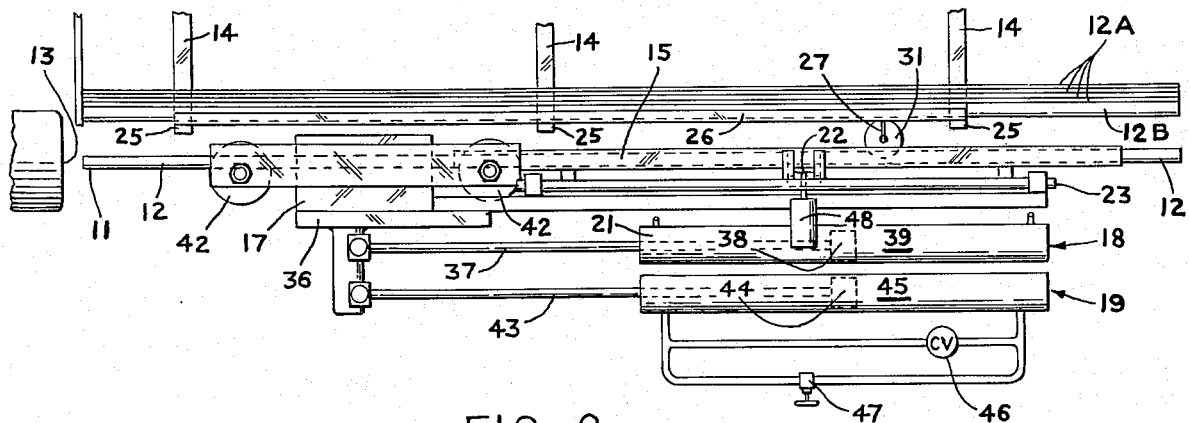
FIG. 2
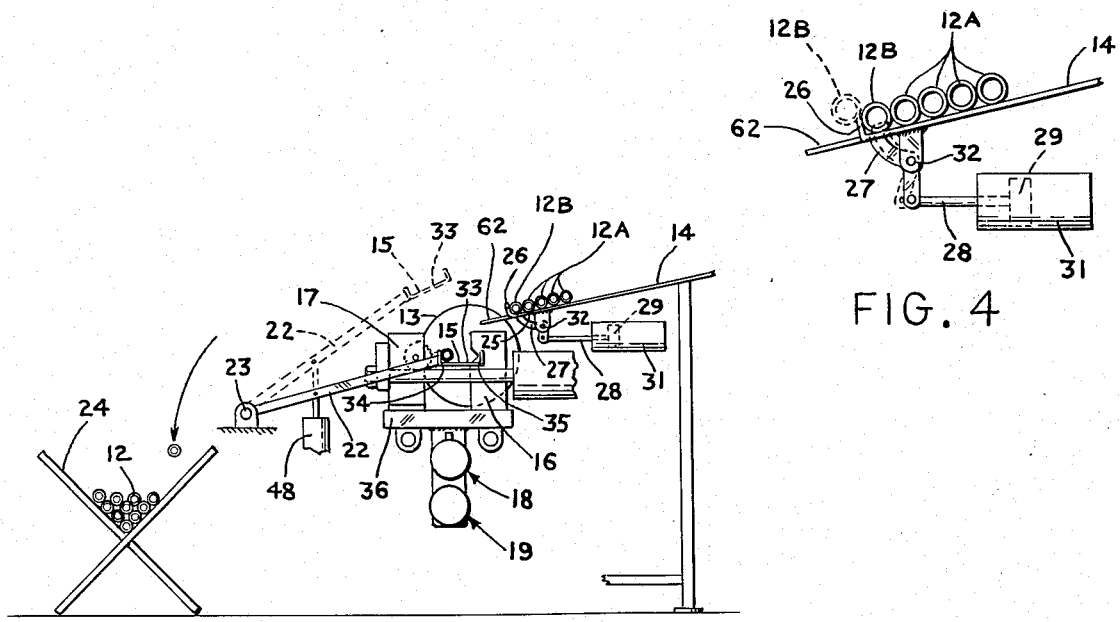
FIG. 3
FIG. 4

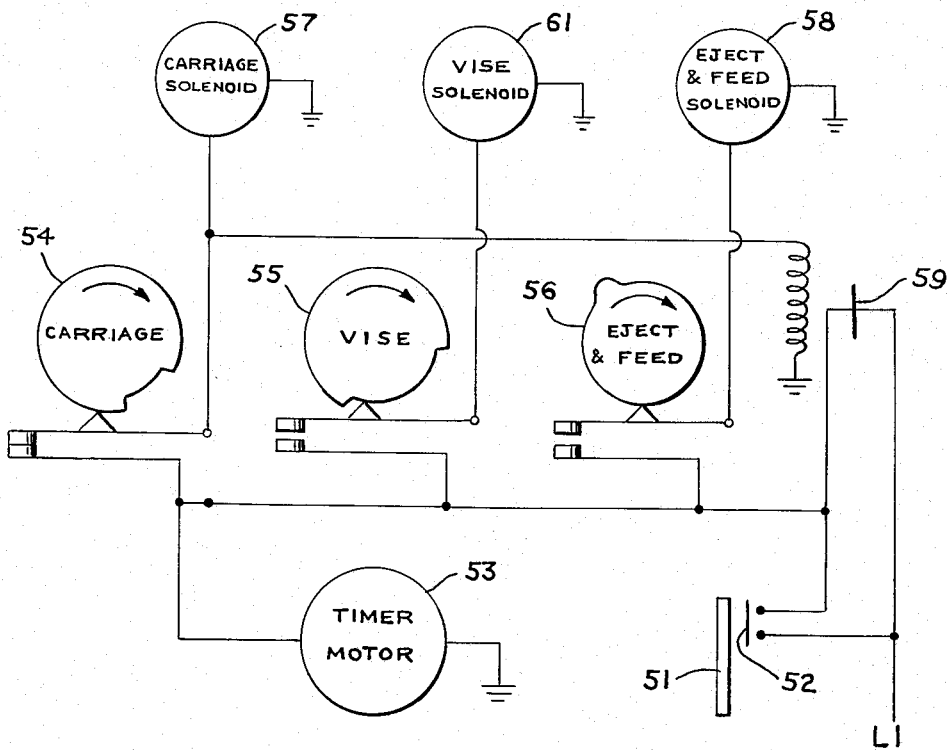
FIG. 5
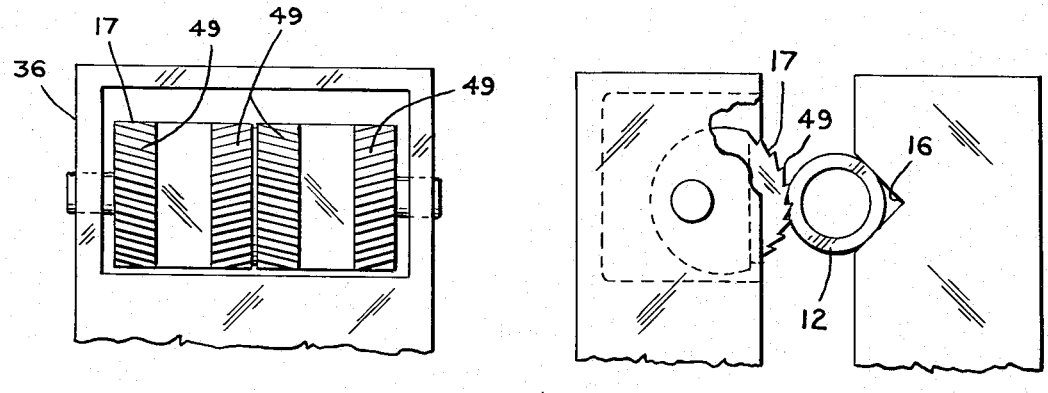
FIG. 6
FIG. 8
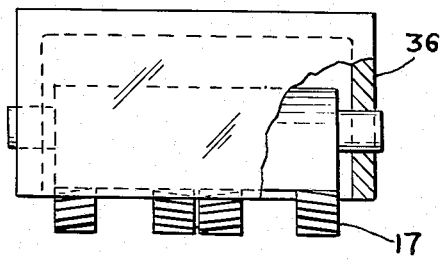
FIG. 7

3,913,751

1

APPARATUS FOR AUTOMATICALLY FEEDING AND REMOVING CYLINDRICAL BODIES TO AND FROM A WORKING HEAD

BACKGROUND OF INVENTION

On construction projects and in industrial applications considerable time and manpower is spent in feeding and removing cylindrical bodies to and from working heads. Accordingly there is a clear and present need for apparatus capable of automatically performing these functions.

STATEMENT OF INVENTION

The present invention will be described in an application wherein it provides automatic threading of electrical conduits in a particularly useful, novel, unobvious and facile way, but it will be understood that the invention has potentially a far wider scope of application. A feed ramp equipped with a delivery crank delivers the conduits one at a time transversely as workpiece conduits to a channel of a work tray wherein the workpiece conduit is gripped by clamping jaws, engaged into a threader head, removed therefrom and then the entire work tray is flipped by an ejector crank to discharge the threaded workpiece conduit to a storage rack whence it is ready for use or further processing.

One object of this invention is to provide apparatus automatically to feed and remove cylindrical bodies to and from a working head.

Another object of this invention, by way of specific application, is to provide apparatus automatically to thread tubular electrical conduits.

Still another object of this invention is to provide apparatus of the character stated which satisfactorily threads the conduits.

Still another object of this invention is to provide apparatus of the character stated which threads the conduits rapidly.

Still another object of this invention is to provide apparatus of the character stated which needs little attention and little maintenance.

Still another object of this invention is to provide apparatus of the character stated which is simple and safe to operate.

Still another object of this invention is to provide apparatus of the character stated which is relatively compact.

Still another object of this invention is to provide apparatus of the character stated which can accommodate a wide variety of conduits sizes and thicknesses.

Still another object of this invention is to provide apparatus of the character stated which can operate efficiently out of doors at construction projects.

Still another object of this invention is to provide apparatus of the character stated which is suited well otherwise to its intended functions.

BRIEF DESCRIPTION OF DRAWINGS

The enumerated features and advantages as well as other features and advantages of this invention will appear more fully from drawings which accompany and form a part of this application viewed in conjunction with a detailed description of a preferred embodiment of the invention and further viewed in conjunction with claims both of which follow. In the drawings, like parts are represented by like numerical designations and:

2

FIG. 1 is a top view of the apparatus according to this invention.

Figure 1A:
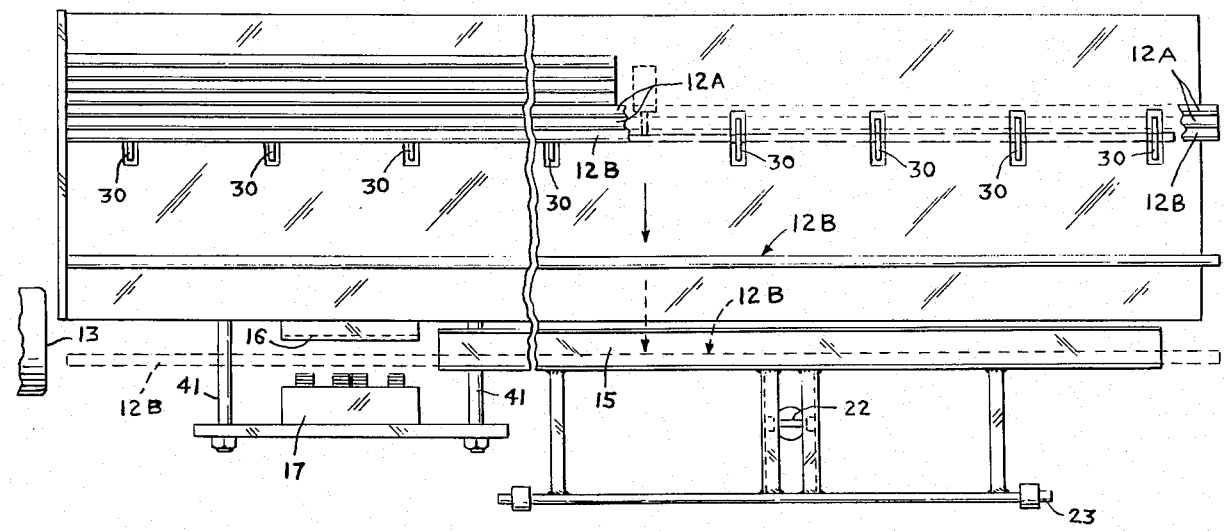

FIG. 1A is an enlarged top view showing conduits on a feed ramp.

FIG. 2 is a side view of the apparatus with the threader head at the left.

FIG. 3 is a right hand view of the apparatus.

FIG. 4 is an enlarged detail view showing the feed ramp and delivery crank.

Figures 4A, 4B:
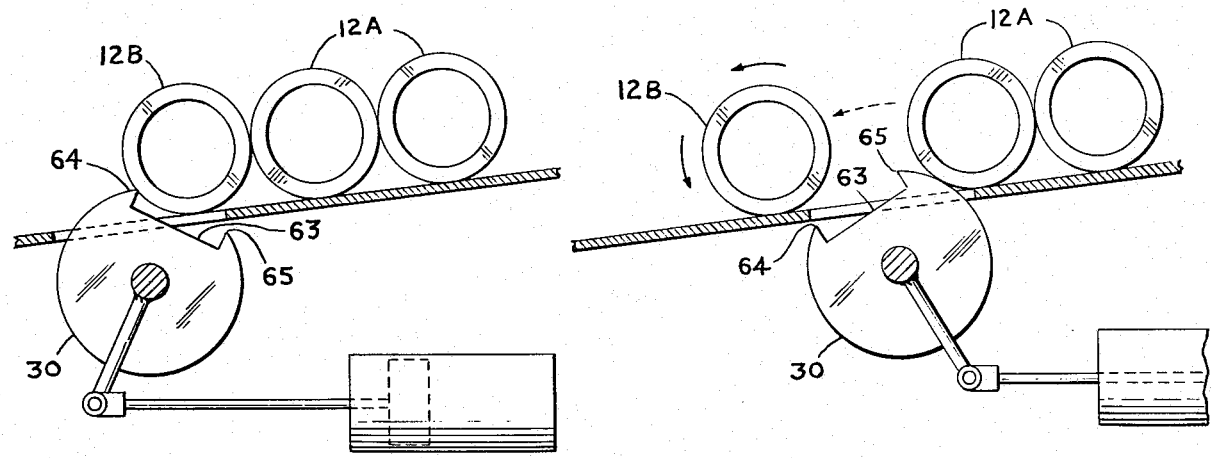

FIGS. 4A and 4B are enlarged detail views showing the feed ramp and another delivery crank in two stages of operation.

FIG. 5 shows the control system for the apparatus.

FIG. 6 is a broken sectional front view showing herringbone threading of the movable jaw.

FIG. 7 is a broken bottom view of the jaw of FIG. 6.

FIG. 8 is a broken sectional view from the right side of the apparatus showing engagement of a workpiece conduit in the clamping jaws.

DESCRIPTION OF PREFERRED EMBODIMENT

In FIGS. 1 and 2 the threader apparatus which is illustrative of this invention is seen to be organized for longitudinal insertion of a first end 11 of a workpiece conduit 12 into a threader head 13 for being threaded therein. The invention resides in delivering a plurality of the conduits 12A one at a time from a feed tray 14 to a work tray 15 to become in turn the workpiece conduit 12, clamping the workpiece conduit 12 between fixed 16 and movable 17 clamping jaws and applying moving means (generally designated as pneumatic cylinder system 18 and hydraulic cylinder system 19). Thereafter returning means, shown as return side 21 of the pneumatic cylinder system 18 (which is double acting), removes the first end 18 of the workpiece conduit 12 from the then opened threader head 13 back to the work tray 15. An ejector crank 22 is mounted pivotally about a longitudinal axis 23 and it flips the entire work tray 15 so that the threaded workpiece conduit 12 is ejected therefrom into a rack 24.

The conduits 12A are delivered to the feed ramp 14 which is arranged longitudinally relative entry into the threader head 13 and which is adjacent as well as above the work tray 15. The feed ramp 14 is adapted to receive a plurality of the conduits 12A thereon and it is preferred that the conduits 12A on the feed ramp lie in a single row, although other feed assemblies are contemplated. The feed ramp 14 is inclined downward toward the work tray 15 so that the conduits 12A therein tend to roll in a transverse direction toward the work tray 15. A lower end 25 of the feed ramp 14 is seen in FIG. 4 to be provided with an upstanding lip 26 projecting therefrom to restrain the conduits 12A from rolling off the feed ramp 14. The feed ramp 14 is provided also with a delivery crank 27 which is connected via a piston 28 to a pneumatically operated piston 29 in a piston cylinder 31, and is pivotally mounted about a fulcrum 32 to lift a lowermost 12B of the conduits 12A in the feed tray 14 over the lip 26 so that the lowermost conduit 12B rolls into a channel 33 formed in the work tray 15. The lowermost conduit 12B from the feed ramp 14 is shown in dashed lines in FIG. 4 as it becomes the workpiece conduit 12 in the channel 33 to undergo threading. In an alternate embodiment of the delivery crank 30, which is shown in FIG. 4A and 4B and which is the most preferred embodiment, a recess 63 has a lower ridge 64 and an upper ridge 65. As shown in FIG. 4A the ridge 64 retains the conduit 12A from rolling down the feed ramp 14. The ridge 65 is shown in FIG. 4B to serve as a temporary retainer for the next conduit 12A when the conduit 12B rolls down the feed ramp 14 to become the workpiece conduit 12.

The work tray 15 defines the upwardly opening channel 33 which is arranged longitudinally relative entry into the threader head 13. The channel 33 is inclined transversely with a lower side 34 and a higher side 35. When the workpiece conduit 12 falls into the channel 33, it rolls to the lower side 34.

The clamping jaws 16, 17 coact with a movable carriage 36 and a piston rod 37 joined to a piston 38 in the pneumatic piston cylinder 39 to advance the workpiece conduit 12 longitudinally into the threader head 13. Toward this objective the fixed clamping jaw 16 is longitudinally oriented at the higher side 35 of the channel 33 and the movable longitudinally oriented jaw 17 is movable between an open position shown in FIG. 1 wherein the movable jaw 17 is spaced from the fixed jaw 16 and transversely clears beyond the work tray 15 for a reason that will become clear. The movable jaw 17 is operated by means of piston rods 41 moved by pneumatic cylinders 42. In engaging the workpiece conduit 12 against the fixed jaw 16, the movable jaw 17 moves the workpiece conduit 12 to the higher side 35 of the channel 33. With the workpiece conduit 12 engaged in the jaws as seen best in FIG. 8, the carriage 36 (on which the jaws 16, 17 are mounted) is moved by the piston rod 37 which coacts with the piston 38 in the pneumatic cylinder 39 to move the carriage leftward whereby the first end 11 of the workpiece conduit 12 is engaged into the threader head 13. Pneumatic cylinder 39 is double acting with a return side 21 so that it can be used as the return means to remove the first end 11 of the workpiece conduit 12 from the threader head 13 back to the work tray 15. The pneumatic cylinder 39 is backed up by a hydraulic brake which is embodied in piston rod 43 connected to a piston 44 mounted in a hydraulic cylinder 45. A check valve 46 and an adjustable valve 47 control the hydraulic brake. Return of the first end 11 of the workpiece conduit 12 from the threader head 13 is effected in a conventional manner.

Release of the movable jaw 17 enables the workpiece conduit 12 to roll to the lower side 34 of the channel 33, so that the workpiece conduit 12 is freed from the fixed jaw 16 which has smooth surfaces. With the movable jaw 17 in its open position as seen best in FIG. 3, the workpiece conduit 12, which rolls to the lower side 34 of the channel 33, is clear for being flipped upward between the jaws 16, 17 for ejection into the rack 24.

Ejection is accomplished by means of the ejector crank 22 which is pivotally mounted about the longitudinal axis 23. A pneumatically operable ejector cylinder 48 rotates the ejector crank 22 flipping the entire work tray 15, so that the workpiece conduit 12 thereby is tossed into the rack 24.

Removable clamping jaw 17 is provided with herringboned teeth 49 as shown best in FIGS. 6 and 7.

Control of the apparatus is basically sequential timing, all of which is relatively conventional. From FIG. 5 viewed in conjunction with FIGS. 1 and 3, the sequence of operations becomes clear. Lever 51 is moved by the carriage 36 to close momentarily a contact switch 52. A timer motor 53 is energized thereby to rotate a carriage cam 54 and vise cam 55 as well as an eject and feed cam 56. Then carriage solenoid 57 is energized whereby the carriage 36 moves rightward and thereby the contact 52 opens with a contact 59 keeping the timer motor 53 energized. Then the movable jaw 17 is opened by means of the vise cam 55, a vise solenoid 61 and the pneumatic cylinder 42. Thereafter there is actuated the ejector cylinder 48 and the kick off cylinder 31, by means of the eject and feed cam 56 and the eject and feed solenoid 58 so that the threaded workpiece conduit 12 in the work tray 15 is flipped into the rack 24 and a next conduit 12B begins rolling down the feed ramp 14. After flipping the threaded conduit 12 from the work tray 15 into the rack 24, the ejector crank 22 returns the work tray 15 to its position shown in FIG. 3 so that it is able to receive the next workpiece conduit 12B. FIG. 3 also shows the work tray 15 as it is being flipped to be in dashed lines. Thereafter the next conduit 12B from the feed ramp 14, having been delivered from the feed ramp 14, falls into the channel 33 and the timer motor 53 closes the movable vise 17 by means of the vise cam 55, the vise solenoid 61 and the pneumatic cylinders 42. The carriage cam 55 deenergizes the carriage solenoid 57 to break the contact 59. The carriage 36 then moves leftward engaging the first end 11 of the next workpiece conduit 12 into engagement with the threader head 13. From that point the cycle repeats.

It will be understood by those skilled in the art that wide deviations may be made from the shown preferred embodiment, without departing from a main theme of invention set forth in claims which follow.

I claim:

1. An apparatus for automatically feeding and removing cylindrical bodies to and from a working head, the apparatus comprising in combination:

a work tray with an upwardly opened channel arranged to hold the bodies one at a time therein in a longitudinal orientation;

a feed ramp transversely adjacent and above the work tray and adapted to receive a plurality of the bodies therein, the feed ramp inclined toward the work tray so that the bodies in the feed ramp tend to roll toward the work tray, the feed ramp provided with a delivery crank which is movable to deliver a lowermost of the bodies so that it rolls into the channel of the work tray as a workpiece;

the channel inclined transversely with a lower side and a higher side;

a pair of clamping jaws mounted on a movable carriage and including a fixed longitudinally oriented jaw at the higher side of the channel and a movable longitudinally oriented jaw which is movable between an open position wherein it clears beyond the work tray and a closed position wherein it grips the workpiece at the higher side of the channel;

a threader head organized to receive longitudinally a first end of the workpiece;

moving means for moving the carriage longitudinally to insert the first end of the workpiece into the working head;

return means for removing the first end of the workpiece from the working head back to the channel;

means for moving the movable jaw to its open position so that the workpiece is allowed to roll to the lower side of the channel and the movable jaw clears the work tray;

the work tray connected to an ejector crank which is pivotally mounted about a longitudinal axis;

means for flipping the ejector crank whereby the workpiece is ejected transversely from the work tray.

2. The threader of claim 1 with the clamping jaws having herringboned teeth.

3. The threader of claim 2 with the moving means comprising a first piston connected between the carriage and a double acting pneumatic cylinder.

4. The threader of claim 3 with a second piston connected between the carriage and a single acting hydraulic dampener cylinder.

5. The threader of claim 4 with the first piston and the double acting pneumatic cylinder also serving as the return means.

* * * * *